United States Patent

Bachmat et al.

[11] Patent Number: 5,974,515
[45] Date of Patent: Oct. 26, 1999

[54] SYSTEM FOR DISTRIBUTING VOLUMES TO AN HSM SYSTEM FRONT END

[75] Inventors: Eitan Bachmat; Hagit Bachmat, both of Hopkinton, Mass.

[73] Assignee: EMC Corporation, Hopkinton, Mass.

[21] Appl. No.: 08/835,772

[22] Filed: Apr. 8, 1997

[51] Int. Cl.$^6$ .................................................. G06F 12/00
[52] U.S. Cl. ............................... 711/170; 711/114; 711/8
[58] Field of Search ........................ 341/81; 711/153, 711/114, 170, 148, 173, 4, 112, 201; 395/182.04, 182.05, 828; 710/8; 714/6, 7

[56] References Cited

U.S. PATENT DOCUMENTS

| 5,568,494 | 10/1996 | Zwaans | 395/182.04 |
| 5,596,736 | 1/1997 | Kerns | 711/4 |
| 5,596,747 | 1/1997 | Katabami et al. | 395/182.05 |
| 5,613,085 | 3/1997 | Lee et al. | 711/114 |
| 5,809,516 | 9/1998 | Ukai et al. | 711/114 |

OTHER PUBLICATIONS

Weiss, Mark Allen, Data Structures and Algorithm Analysis in C. Section 7.6. CD–Rom. California: Dr. Dobb's Essential Books on Algorithms and Data Structures, 1995.

*Primary Examiner*—Eddie P. Chan
*Assistant Examiner*—Yamir Encarnacion
*Attorney, Agent, or Firm*—Maureen Stretch

[57] ABSTRACT

A system for distributing logical volumes to an HSM system front end by ordering an array of logical volumes so that each volume that is likely to conflict with another volume is significantly separated from that other volume. Ordering is done iteratively, beginning with the disk type, and then iterating through the logical volume level, next through a target level (the physical disk), then SCSI level, then the disk adapter level, then system level until all the disks in all the disk adapters in the HSM system have been ordered. As each iteration occurs, units in a source array from the level being operated on are ordered so that those close to each other are moved apart, within the space available, in the destination array according to a procedure that establishes a gap between them that is based on an approximate ratio of the number of units in the source array to the number of spaces available in the destination array. When the volumes have been distributed, the present invention allocates the distributed volumes to ports on the host computers sharing the HSM system and also optimizes distribution of RAID subgroups, if possible.

4 Claims, 18 Drawing Sheets

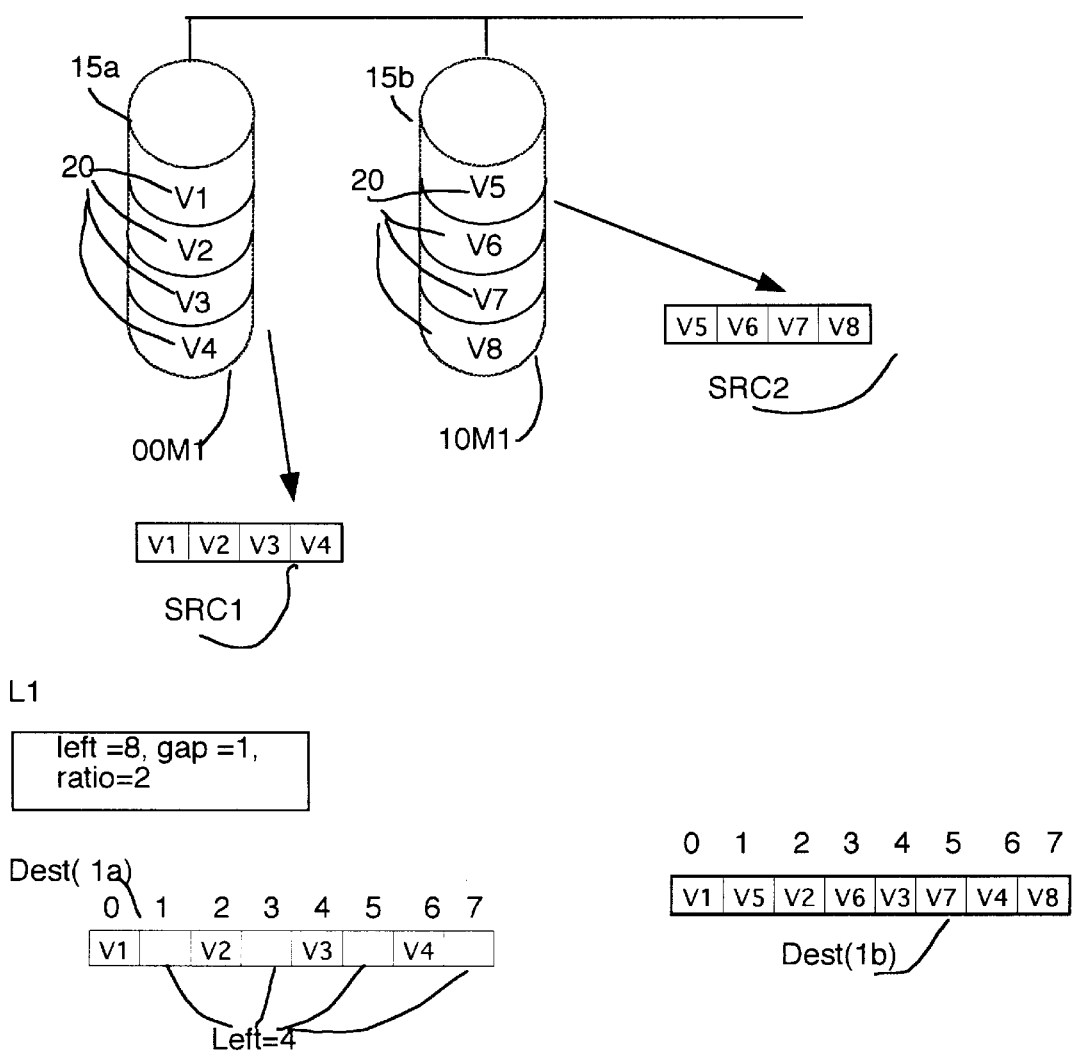

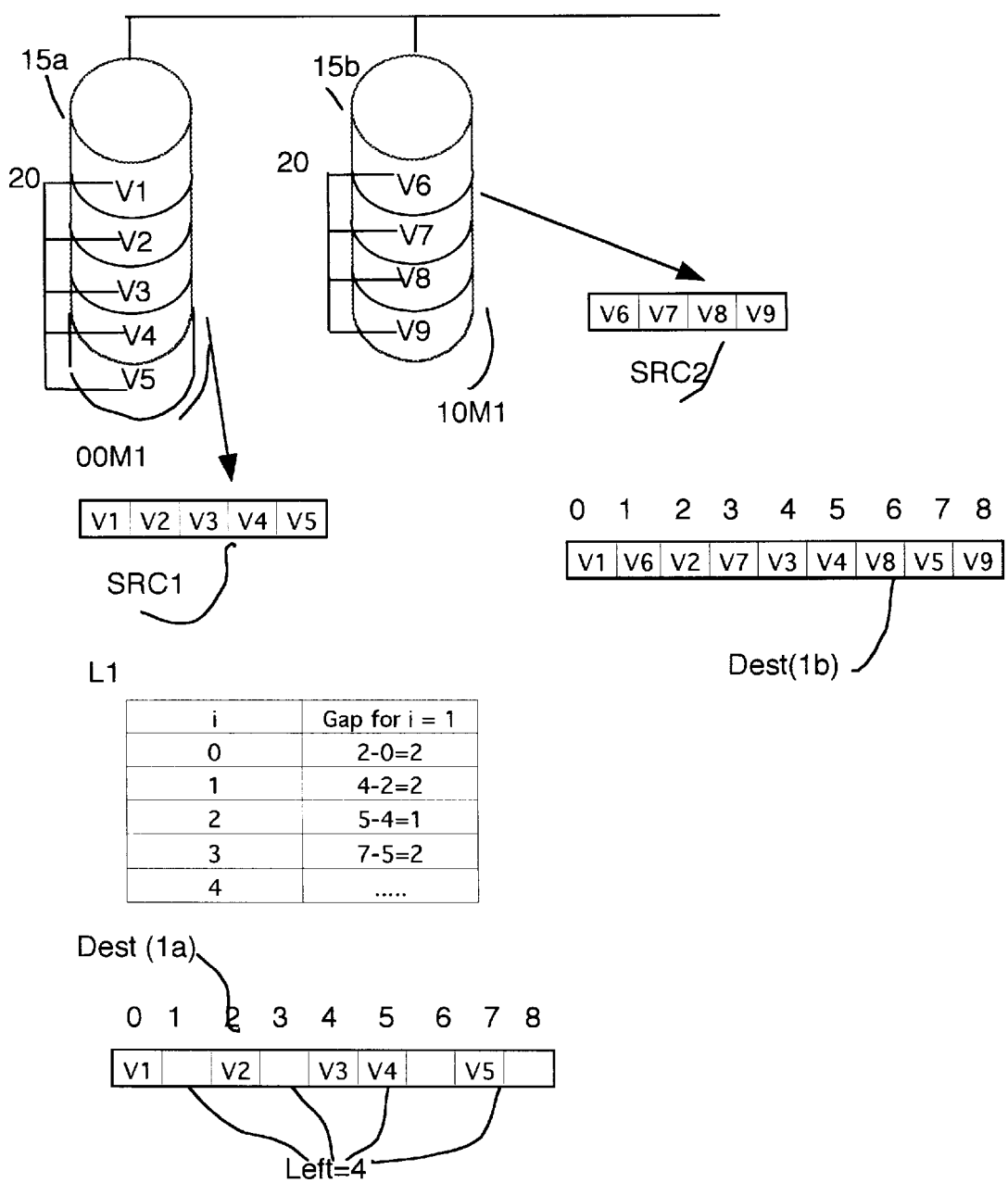

Fig. 4

Host's names

| | Port A | Port B | Port C | Port D |
|---|---|---|---|---|
| SA-3 | ATT-1 | Sequent-6 | ATT-1 | |
| SA-4 | HP-HOST | Sequent-8 | | |
| SA-5 | ATT-1 | Sequent-6 | | |
| SA-6 | ATT-1 | Sequent-6 | ATT-EVEREST | |
| SA-11 | SGI | Sequent-8 | | |
| SA-12 | SGI | Sequent-A | | |
| SA-13 | HP-HOST | | | |
| SA-14 | ATT-1 | Sequent-6 | ATT-1 | |

☐ Save   ✗ Cancel   ? Help

Config request ☐ ☐ ☐ ☐ ☐ ☐ [X]

| | Type:<br>Emul:<br>Cyls: | 2M<br>FBA-12<br>8862 | 2M<br>FBA-12<br>8738 | V<br>FBA-12<br>8862 |
|---|---|---|---|---|
| | Total: | 100 | 16 | 20 |
| | Left: | 0 | 0 | 0 |
| 1 | ATT-1 | 40 | | 2 |
| 2 | SEQUENT | 10 | 3 | 2 |
| 3 | HP-HOST | | 6 | 2 |
| 4 | SEQUENT- | 20 | 3 | 2 |
| 5 | ATT- | 20 | | 2 |
| 6 | SGI | 10 | | 2 |
| 7 | SEQUENT-A | | 4 | 8 |

[LUN Params]

Config request — LUN Params

| | | Type: Emul: Cyls: | 2M FBA-12 8862 | 2M FBA-12 8738 | V FBA-12 8862 |
|---|---|---|---|---|---|
| | | Total: | 100 | 16 | 20 |
| | | Left: | 0 | 0 | 0 |
| 1 | ATT-1 | | 40 | 0 | 2 |
| 2 | SEQUENT-6 | | 10 | 3 | 2 |
| 3 | HP-HOST | | | 6 | 2 |
| 4 | SEQUENT-8 | | 20 | 3 | 2 |
| 5 | ATT-EVEREST | | 20 | | 2 |
| 6 | SGI | | 10 | | 2 |
| 7 | SEQUENT-A | | | 4 | 8 |

ATT-1 Volumes — ATT-1

| | 2M FBA-12 8862 | 2M FBA-12 8738 | V FBA-12 8862 |
|---|---|---|---|
| SA-3A | 10 | | |
| SA-3C | 2 | | |
| SA-5A | 3 | | |
| SA-6A | | | |
| SA-14A | | | 2 |
| SA-14C | | | |

*Fig. 7a*

ATT-1 Volumes

| SA3 A Chm IAd | SA3 A Chn | SA5 A Chn | SA5 A Chn | SA6 A Chn | SA14 A Chn | SA14 C Chm | Vo | Serial | Type | Emu | Das Size | 1 C | D | E | F | 2 C | D | E | F | 7 C | D | E | F | 8 C | D | E | F | 9 C | D | E | F | 10 C | D | E | F | 16 C | D | E | F | 16 C | D | E | F |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 00 | | | | | | | 10 | 85010030 | 2M | FBA-12 | 8862 | 0 | | | | | | | | | | | | | | | | | | | | | | | | | | | | | | |
| 01 | | | | | | | 11 | 85011030 | 2M | FBA-12 | 8862 | | | | | | 0 | | | | | | | | | | | | | | | | | | | | | | | | | |
| 02 | | | | | | | 12 | 85012030 | 2M | FBA-12 | 8862 | | | | | | | | | | 0 | | | | | | | | | | | | | | | | | | | | | |
| 03 | | | | | | | 13 | 85013030 | 2M | FBA-12 | 8862 | | | | | | | | | | | | | | | | 0 | | | | | | | | | | | | | | | |
| 04 | | | | | | | 14 | 85014030 | 2M | FBA-12 | 8862 | | | | | | | | | | | | | | | | | | | 0 | | | | | | | | | | | | |
| 05 | | | | | | | 15 | 85015030 | 2M | FBA-12 | 8862 | | | 0 | | | | | | | | | | | | | | | | | | | | | | | | | | | | |
| 06 | | | | | | | 16 | 85016030 | 2M | FBA-12 | 8862 | | | | | 0 | | | | | | | | | | | | | | | | | | | | | | | | | | |
| 07 | | | | | | | 17 | 85017030 | 2M | FBA-12 | 8862 | | | | | | | | 0 | | | | | | | | | | | | | | | | | | | | | | | |
| 08 | | | | | | | 18 | 85018030 | 2M | FBA-12 | 8862 | | | | | | | | | | | 0 | | | | | | | | | | | | | | | | | | | | |
| 09 | | | | | | | 19 | 85019030 | 2M | FBA-12 | 8862 | | | | | | | | | | | | | 0 | | | | | | | | | | | | | | | | | | |
| | 00 | | | | | | 1A | 8501A032 | 2M | FBA-12 | 8862 | | | | | | | | | | | | | | | 0 | | | | | | | | | | | | | | | | |
| | 01 | | | | | | 1B | 8501B032 | 2M | FBA-12 | 8862 | 1 | | | | | | | | | | | | | | | | | | | | | | | | | | | | | | |
| | | 00 | | | | | 1C | 8501C050 | 2M | FBA-12 | 8862 | | | | | | | | | | | | 0 | | | | | | | | | | | | | | | | | | | |
| | | 01 | | | | | 1D | 8501D050 | 2M | FBA-12 | 8862 | | | | | | | | | | | | | | | 0 | | | | | | | | | | | | | | | | |
| | | 02 | | | | | 1E | 8501E050 | 2M | FBA-12 | 8862 | | 0 | | | | | | | | | | | | | | | | | | | | | | | | | | | | |
| | | | 02 | | | | 1F | 8501F050 | 2M | FBA-12 | 8862 | | | | 0 | | | | | | | | | | | | | | | | | | | | | | | | | | | |
| | | | | | 0A | | 20 | 85020140 | V | FBA-12 | 8862 | | | | | | | 0 | | | | | | | | | | | | | | | | | | | | | | | |
| | | | | | 0B | | 21 | 85021140 | V | FBA-12 | 8862 | | | | | 1 | | | | | | | | | | | | | | | | | | | | | | | | | |
| | | | | 00 | | | 34 | 85034140 | 2M | FBA-12 | 8862 | | 1 | | | | | | | | | | | | | | | | | | | | | | | | | | | | |
| | | | | | 01 | | 35 | 85035140 | 2M | FBA-12 | 8862 | | | | | | | | | 1 | | | | | | | | | | | | | | | | | | | | | |
| | | | | | | 06 | 36 | 85036140 | 2M | FBA-12 | 8862 | | | | | | | | | | | | | 1 | | | | | | | | | | | | | | | | | |
| | | | | 04 | | | 37 | 85037142 | 2M | FBA-12 | 8862 | | | | | | | | | | | | | | | | | 1 | | | | | | | | | | | | | |
| | | | 00 | | | | 38 | 85038060 | 2M | FBA-12 | 8862 | | | | | | | | | | | | | | | | | | | 1 | | | | | | | | | | | |
| | | | | 05 | | | 39 | 85039060 | 2M | FBA-12 | 8862 | | | | | | | | | | | | | | | | | | | | | 1 | | | | | | | | | |
| | | | | | | | 3A | 8503A060 | 2M | FBA-12 | 8862 | | | | | | | | | | | | | | | | | | | | | | | 1 | | | | | | | |
| | | | | 03 | | | 3B | 8503B060 | 2M | FBA-12 | 8862 | | | | | | | | | | | | | | | | | | | | | | | | | 1 | | | | | |
| | | | | | | | 3C | 8503C060 | 2M | FBA-12 | 8862 | | | | | | | | | | | | | | | | | | | | | | | | | | | 1 | | | |
| | | | | 06 | | | 3D | 8503D060 | 2M | FBA-12 | 8862 | | | | | 2 | | | | | | | | | | | | | | | | | | | | | | | | | |
| | | | | 07 | | | 3E | 8503E060 | 2M | FBA-12 | 8862 | | | | | | | | | 2 | | | | | 2 | | | | | 2 | | | | 2 | | | | 2 | | | 2 | |
| | | | | 08 | | | 3F | 8503F060 | 2M | FBA-12 | 8862 | 2 | | | | | | | | | | | | | | | | | | | | | | | | | | | | | | |

Fig. 7b — ATT-1 volumes (Continue...)

| SA3 A Chnl Add | SA A Chnl Add | SA 6A Chnl Add | SA14 A Chnl Add | SA1 4C Chnl Add | Vol | Serial No. | Typ | Emul | Size | Das 1 C D E F | 2 C D E F | 7 C D E F | 8 C D E F | 9 C D E F | 10 C D E F | 15 C D E F | 16 C D E F |
|---|---|---|---|---|---|---|---|---|---|---|---|---|---|---|---|---|---|
| | | | | 00 | | 40 | 85040142 | 2M | FBA-12 | 8862 | | | | | | | | |
| | | | | 01 | | 41 | 85041142 | 2M | FBA-12 | 8862 | | | | | | | | |
| | | | | 04 | | 50 | 85050142 | 2M | FBA-12 | 8862 | 3 | | | | | | | |
| | | | | 05 | | 51 | 85051142 | 2M | FBA-12 | 8862 | | | | | | | | |
| | | | | 02 | | 52 | 85052142 | 2M | FBA-12 | 8862 | | 3 | | | | | | |
| | | | | 03 | | 53 | 85053142 | 2M | FBA-12 | 8862 | | | | | 2 3 | | | |
| | | | | 08 | | 54 | 85054142 | 2M | FBA-12 | 8862 | | | 3 | 3 | | | | |
| | | | | 07 | | 56 | 85056142 | 2M | FBA-12 | 8862 | | | 2 | | | | | |
| | | | 04 | | | 7E | 85057E140 | 2M | FBA-12 | 8862 | | 3 | 3 | | | | | |
| | | | 05 | | | 7F | 85057F140 | 2M | FBA-12 | 8862 | | | | | | 1 | 1 | 1 |
| | | | 02 | | | 80 | 85080140 | 2M | FBA-12 | 8862 | | | | | | 2 | 2 | 2 |
| | | | 03 | | | 81 | 85081140 | 2M | FBA-12 | 8862 | | | | | 3 | 3 | 3 | 3 |

Fig. 8

ATT-EVEREST VOLUMES

| SA6 C Chn | Vol | Serial | Type | Emul | Size | Das: 1 | | | | 2 | | | | 7 | | | | 8 | | | | 9 | | | | 10 | | | | 15 | | | | 16 | | | |
|---|---|---|---|---|---|---|---|---|---|---|---|---|---|---|---|---|---|---|---|---|---|---|---|---|---|---|---|---|---|---|---|---|---|---|---|---|
| | | | | | | C | D | E | F | C | D | E | F | C | D | E | F | C | D | E | F | C | D | E | F | C | D | E | F | C | D | E | F | C | D | E | F |
| 14 | 26 | 85026062 | V | FBA-12 | 8862 | | | | | | | | | | | | | | | | | | | | | | | | | | | | | | | | |
| 15 | 27 | 85027062 | V | FBA-12 | 8862 | | | | | | | | | | | | | | | | | | | | | | | | | 1 | | | | 1 | | | |
| 02 | 44 | 85044062 | 2M | FBA-12 | 8862 | | | | | | | | | | | | | | | | | | | | | | | | | | | | | | | 1 | | |
| 09 | 45 | 85045062 | 2M | FBA-12 | 8862 | | | | | | | 1 | | | | | | | | | | | | | | | | | | | | | | | | | 1 |
| 03 | 4E | 8504E062 | 2M | FBA-12 | 8862 | | | | | | | | | | | | 1 | | | | | | | | | | | | 1 | | | | | | | | |
| 04 | 4F | 8504F062 | 2M | FBA-12 | 8862 | | | | | | | | | | | | | | | | 3 | | | | | | | | | | | 1 | | | | 2 | |
| 07 | 66 | 85066062 | 2M | FBA-12 | 8862 | 3 | | | | | | | | | | | | | | | | | 2 3 | | | | | | | | | | | | | | | |
| 08 | 67 | 85067062 | 2M | FBA-12 | 8862 | | | | | | 3 | | | | | | | | | | | | | | | 3 | | | | | | | | | | | |
| 05 | 68 | 85068062 | 2M | FBA-12 | 8862 | | | | | | | | | | 3 | | | 3 | | | | | | | | | | | 2 | | | | | | | | |
| 06 | 69 | 85069062 | 2M | FBA-12 | 8862 | | | | | | | | | | | | | | | | 2 | | | | | | | | | | | | | | | | |
| 0B | 6A | 8506A062 | 2M | FBA-12 | 8862 | | | | | | | | | | | | | | | | | | | | | | | | | | 2 | | | | | | |
| 0C | 6B | 8506B062 | 2M | FBA-12 | 8862 | | | | | | | | | | | | 2 | | | | | | | | | | | | | | | | 1 | | | | |
| 0A | 6C | 8506C062 | 2M | FBA-12 | 8862 | | | | | | 2 | | | 3 | | | | | | | | | | | | | | | | | | | | | | | |
| 0D | 6D | 8506D062 | 2M | FBA-12 | 8862 | | | | | 2 | | | | | 2 | | | | | | | | | 2 | | | | | | | | | | | | | |
| 0F | 6E | 8506E062 | 2M | FBA-12 | 8862 | | | | | | | | | | | | | | | | | | | | | | | | | | | 2 | | | | | |
| 10 | 6F | 8506F062 | 2M | FBA-12 | 8862 | | | | | | | | | | | | | | | | | | | | | | | | | 3 | | | | | | | |
| 0E | 70 | 85070062 | 2M | FBA-12 | 8862 | | | | | | | | | | | 2 | | | | | | | | | | | | 2 | | | | | | | | | |
| 11 | 71 | 85071062 | 2M | FBA-12 | 8862 | | | | | | | | | | | | | | | | | | | | | | | 3 | | | | | | | | | |
| 12 | 72 | 85072062 | 2M | FBA-12 | 8862 | | | | | | | | | | | | | | | | | | | | | | | | | | | | | | | | |
| 13 | 73 | 85073062 | 2M | FBA-12 | 8862 | | | | | | | 3 | | | | | | | | | | | | | | | | | | | | | 3 | | | | |
| 00 | 84 | 85084062 | 2M | FBA-12 | 8862 | | | | | | | | | | | | | | | | | | | | | | | | | | | | | | | | 3 |
| 01 | 85 | 85085062 | 2M | FBA-12 | 8862 | | | | | | | | | | | | 3 | | | | | | | | | | | | | | | | | | | | |

Fig. 9

HP-HOST volumes

| SA4 Chnl Add. | SA13 Chnl Add. | Vol | Serial No. | Type | Emul | Das: Size | 1 C D E F | 2 C D E F C | 7 C D E F C | 8 D E F C | 9 D E F C | 10 E F C D E F C | 15 D E F C | 16 D E F |
|---|---|---|---|---|---|---|---|---|---|---|---|---|---|---|
| 00 | | 03 | 85003040 | 2M | FBA-12 | 8738 | | | | | | o | | |
| 01 | | 04 | 85004040 | 2M | FBA-12 | 8738 | | | | | o o | | | |
| 02 | | 05 | 85005040 | 2M | FBA-12 | 8738 | | | | o | | | | |
| | 00 | 06 | 85006130 | 2M | FBA-12 | 8738 | | | | | | o | | |
| | 01 | 07 | 85007130 | 2M | FBA-12 | 8738 | | | o | | | | o | |
| | 02 | 08 | 85008130 | 2M | FBA-12 | 8738 | | o | | | | | | |
| 03 | | 22 | 85022040 | V | FBA-12 | 8862 | o | | 1 | | | | | o |
| | 03 | 23 | 85023130 | V | FBA-12 | 8862 | | | | 1 | | | | o |

Fig. 10

Sequent-6 volumes

| SA3 B Chn | SA5 Chn | SA6 B Chn | SA1 4B Chn | Vol | Serial No. | Type | Emul | Das Size | 1 C D E F | 2 C D E F | 7 C D E F | 8 C D E F | 9 C D E F | 10 C D E F | 15 C D E F | 16 C D E F |
|---|---|---|---|---|---|---|---|---|---|---|---|---|---|---|---|---|
| 00 | — | — | — | 00 | 85000031 | 2M | FBA-12 | 8738 | 0 | | | | | | | |
| | — | 00 | — | 01 | 85001061 | 2M | FBA-12 | 8738 | | 0 | | | | | | |
| | — | — | 00 | 02 | 85002141 | 2M | FBA-12 | 8738 | | | | | | | | |
| | 04 | — | — | 24 | 85024051 | V | FBA-12 | 8862 | | | | | 1 | | | |
| | — | — | — | 25 | 85025061 | V | FBA-12 | 8862 | | | | | 3 | 3 | | |
| 01 | 01 | — | — | 55 | 85055031 | 2M | FBA-12 | 8862 | | 2 | | | | | | |
| 02 | 02 | — | — | 57 | 85057031 | 2M | FBA-12 | 8862 | | | 0 | 2 | | | | |
| | 03 | — | — | 58 | 85058051 | 2M | FBA-12 | 8862 | | | | 3 | | | | |
| 03 | — | — | — | 59 | 85059051 | 2M | FBA-12 | 8862 | | | | 2 | 2 | | | |
| | — | — | — | 5A | 8505A031 | 2M | FBA-12 | 8862 | | | | 3 | 3 | | | |
| | — | 01 | — | 5B | 8505B051 | 2M | FBA-12 | 8862 | | | | | 2 | | | |
| | — | 02 | — | 5C | 8505C061 | 2M | FBA-12 | 8862 | | | | | | 3 | | |
| | — | — | — | 5D | 8505D061 | 2M | FBA-12 | 8862 | | | | | | | 3 | |
| | — | — | 01 | 5E | 8505E141 | 2M | FBA-12 | 8862 | | | | | | | 2 | 2 |
| | — | — | 02 | 5F | 850F141 | 2M | FBA-12 | 8862 | | 2 | | | | | | 3 |

Fig. 11

SEQUENT-8 VOLUMES

Das:

| SA4 Chnl Add. B | SA11 Chnl Add. | SA12 Chnl Add. | Vol | Serial No. | Type | Emul | Size | 1 C D E | 2 F C D E F | 7 C D E F | 8 C D E F | 9 C D E F | 10 C D E F | 15 C D E F | 16 C D E F |
|---|---|---|---|---|---|---|---|---|---|---|---|---|---|---|---|
| 00 | 00 | | 09 | 85009041 | 2M | FBA-12 | 8738 | | 0 | 0 | 0 | | | 0 | |
| | | | 0A | 8500A111 | 2M | FBA-12 | 8738 | | | | | | | | |
| | | 00 | 0B | 8500B121 | 2M | FBA-12 | 8738 | | | | | | | | |
| 01 | | | 28 | 85028041 | V | FBA-12 | 8862 | 1 | | | | | | | |
| | 01 | | 29 | 85029121 | V | FBA-12 | 8862 | | 1 | | | | | | |
| | 04 | | 42 | 85042121 | 2M | FBA-12 | 8862 | | | | | | | | |
| | 05 | | 43 | 85043121 | 2M | FBA-12 | 8862 | | | | | | | | |
| | | 03 | 46 | 85046111 | 2M | FBA-12 | 8862 | | | | | | | | |
| | 04 | | 47 | 85047111 | 2M | FBA-12 | 8862 | 1 | 1 | 1 | 1 | 1 | 1 | 1 | 1 |
| | 06 | | 48 | 85048111 | 2M | FBA-12 | 8862 | | | | | | | | |
| | 07 | | 49 | 85049111 | 2M | FBA-12 | 8862 | | | | | | | | |
| | 05 | | 4A | 8504A111 | 2M | FBA-12 | 8862 | | | | | | | | |
| | 08 | | 4B | 8504B111 | 2M | FBA-12 | 8862 | | | | | | | | |
| | | 02 | 4C | 8504C121 | 2M | FBA-12 | 8862 | 2 | 2 | 2 | 2 | 2 | 2 | 2 | 2 |
| | | 03 | 4D | 8504D121 | 2M | FBA-12 | 8862 | | | | | | | | |
| 02 | | | 60 | 85060041 | 2M | FBA-12 | 8862 | | | | | | | | |
| 03 | | | 61 | 85061041 | 2M | FBA-12 | 8862 | | | | | | | | |
| 04 | | | 62 | 85062041 | 2M | FBA-12 | 8862 | | | | | | | | |
| 05 | | | 63 | 85063041 | 2M | FBA-12 | 8862 | | 3 | | 3 | 3 | 3 | 3 | |
| 06 | | | 64 | 85064041 | 2M | FBA-12 | 8862 | | | | | | | | |
| 07 | | | 65 | 85065041 | 2M | FBA-12 | 8862 | | | | | | | 3 | |
| 08 | | | 7C | 8507C041 | 2M | FBA-12 | 8862 | | | | 3 | | | | 3 |
| | 02 | | 7D | 8507D111 | 2M | FBA-12 | 8862 | 3 | 3 | | | | | | |
| | 06 | | 86 | 85086121 | 2M | FBA-12 | 8862 | | | | | | | | |
| | 07 | | 87 | 85087121 | 2M | FBA-12 | 8862 | | | | | | | | 3 |

Fig. 12

SEQUENT-A VOLUMES

| SA1 3B | | | | | Das: | 1 | | | | 2 | | | | 7 | | | | 8 | | | | 9 | | | | 10 | | | | 15 | | | | 16 | | | |
|---|---|---|---|---|---|---|---|---|---|---|---|---|---|---|---|---|---|---|---|---|---|---|---|---|---|---|---|---|---|---|---|---|---|---|---|---|
| Chnl Add. | Vol | Serial | Type | Emul | Size | C | D | E | F | C | D | E | F | C | D | E | F | C | D | E | F | C | D | E | F | C | D | E | F | C | D | E | F | C | D | E | F |
| 00 | 0C | 8500C131 | 2M | FBA-12 | 8738 | | | | | | | | | | | | | | | | | | 0 | | | | | | | | | | | | | | | |
| 01 | 0D | 8500D131 | 2M | FBA-12 | 8738 | | | | | | | | | | | 0 | | | | | | | | | | | | | 0 | | | | | | | | | | |
| 02 | 0E | 8500E131 | 2M | FBA-12 | 8738 | | 0 | | | | | | | | | | | | | | | | | | | | | | | | | | | | | | | | | |
| 03 | 0F | 8500F131 | 2M | FBA-12 | 8738 | | | | | | | | | | | | | | | | | | | | | | | | | | | | | | | | | 0 | | |
| 06 | 2A | 8502A131 | V | FBA-12 | 8862 | | | | | | | | | | 1 | | | | | | | | | | | | | | | | | | | | | | | | | |
| 07 | 2B | 8502B131 | V | FBA-12 | 8862 | | | | | | | | | | | | | 1 | | | | | | | | | | | | | | | | | | | | | | |
| 04 | 2C | 8502C131 | V | FBA-12 | 8862 | | | | | | | | | | | | | | | | | | | | | | 1 | | | | | | | | | | | | | |
| 05 | 2D | 8502D131 | V | FBA-12 | 8862 | | | | | | | | | | | | | | | | | | | | | | | | | 1 | | | | | | | | | | |
| 0A | 2E | 8502E131 | V | FBA-12 | 8862 | | | | | | | | | | | | | | | | | | | | | | | | | | | | | | | | | | | |
| 0B | 2F | 8502F131 | V | FBA-12 | 8862 | | | | | | | | | | | | | | | | | | | | | | | | | | | | | | | | | | | |
| 08 | 32 | 85032131 | V | FBA-12 | 8862 | 1 | | | | | | | | | | | | | | | | | | | | | | | | | | | | 1 | | | | | | |
| 09 | 33 | 85033131 | V | FBA-12 | 8862 | | | | | 1 | | | | | | | | | | | | | | | | | | | | | | | | | | | | 1 | | |

Fig. 13

SGI VOLUMES

| SA11 A | SA12 Chnl Add. | Vol | Serial No. | Type | Emul | Size | Das: 1 C D E F | 2 C D E F | 7 C D E F | 8 C D E F | 9 C D E F | 10 C D E F | 15 C D E F | 16 C D E F |
|---|---|---|---|---|---|---|---|---|---|---|---|---|---|---|
| 05 | | 30 | 85030110 | V | FBA-12 | 8862 | 1 | | | | | | | |
| | 05 | 31 | 85031120 | V | FBA-12 | 8862 | | 1 | | | | | | |
| 00 | | 74 | 85074110 | 2M | FBA-12 | 8862 | | 2 | | | | | | |
| 01 | | 75 | 85075110 | 2M | FBA-12 | 8862 | 2 | | | | | | | |
| 02 | | 76 | 85076110 | 2M | FBA-12 | 8862 | 3 | | | | | | | |
| 03 | | 77 | 85077110 | 2M | FBA-12 | 8862 | | 3 | | | | | | |
| 04 | | 78 | 85078110 | 2M | FBA-12 | 8862 | | | 3 | | | | | |
| | 00 | 79 | 85070120 | 2M | FBA-12 | 8862 | | | 2 | | | | | |
| | 01 | 7A | 8507A120 | 2M | FBA-12 | 8862 | | | | 3 | | | | |
| | 02 | 7B | 8507B120 | 2M | FBA-12 | 8862 | | | | 2 | 3 | | | |
| | 03 | 82 | 85082120 | 2M | FBA-12 | 8862 | | 3 | | | 2 | 2 | 3 | 3 |
| | 04 | 83 | 85083120 | 2M | FBA-12 | 8862 | 3 | | | | | | 3 | 3 |

Fig. 14

```
L1   Procedure TTypeOrder.merge(dist : PDevsList; nd, left : integer; source :
L2   PDevsList; ns; integer
L3   var
L4     last, i, j, gap : integer;
L5     ratio : real;
L6   begin
L7     if (ns<= 0) or (left <ns) then exit;
L8     last := 0;
L9     ratio := left / ns;
L10    gap := 1;
L11    for i := 0 to ns - 1 do begin
L12      for j := last to nd-1 do
L13        if dist^[j] < 0 then begin  {Counts only the empty ones}
L14          dec(gap);
L15          if (gap = 0) then begin
L16            last := j;
L17            break;
L18            end;
L19          end;
L21      if gap <> 0 then begin
L22        internalErrMsg(FRNTCNFG.Merge:Miscalculating");
L23        exit;
L24        end;
L25      dist^[last] := source^[i];
L26      gap := trunc(ratio * (i+1) + 0.5) - trunc(ratio * i + 0.5) ; {For next time}
L27      inc(last) ;
L28      end;
L29  end;
```

SYSTEM FOR DISTRIBUTING VOLUMES TO AN HSM SYSTEM FRONT END

BACKGROUND OF THE INVENTION

1. Field of the Invention

The present invention relates generally to the field of electronic storage media such as magnetic disk drives and more particularly to a method and apparatus for distributing volumes on multi-disk systems such as Hierarchical Storage Management (HSM) systems.

2. Background

In present-day HSM systems having multiple magnetic disk drives, the disks can be configured in a number of ways on the same system. In EMC Corporation's Symmetrix™ systems, for example, a user can request that logical volumes be configured as Redundant Arrays of Independent Disks (RAID) volumes of several different types, typically RAID level 1, which is usually understood to mean 100% mirroring or duplication of data, or RAID level 4 which uses parity. That is, some of the disks in an HSM system may be configured as RAID level 1 disks to contain mirror images, while others may be configured as RAID level 4, and other possibilities also exist. Such a system as shown in FIG. 3, is usually described as having logic elements and channels (system adapters SA) that communicate with the host computers (ATT-1, HP-HO, etc.) connected to the HSM system, and a cache memory and disk adapters (DA1–DA6), which are connected to disks over SCSI channels C, D, E, F in each disk adapter DA, to physical disks 00M1, 10M1 and so on. In laying out the disks on the back-end, a software program such as that used by EMC Corporation for its Symmetrix™ Systems is used to allocate logical volumes of various types to the actual physical disks. (Physical disks, such as physical disk 00M1 are usually larger than logical volumes. Two or more logical volumes, also known as hyper volumes can typically fit on one physical disk.)

When such an HSM system is used by one or more open system host computers A, B, C, or D, such as systems using the Unix operating system or its derivatives (ATT Unix, Sequent, HP, Silicon Graphics, etc, ) however, it is also important to distribute the logical volumes to the host computers on the front-end in such a way that the host computer not only gets the type of volumes (RAID levels 1, or 4, etc.) it desires, but also, if possible, in a way that is likely to produce reasonably good performance. Performance bottlenecks will occur if all the logical volumes distributed to that host physically reside on the same disc or SCSI channel, for example. To prevent such problems, the logical volumes for each host in an open systems environment need to be allocated to adapters, channels and disks in a way that is likely to reduce this occurrence. Presently, this is done in a very time and labor-intensive manual process for each HSM system.

The problem of distributing volumes to an HSM system's front-end (the host computers) in a timely manner is unique to open systems or those that follow file conventions similar to those of the principal open system, the Unix operating system and its derivatives and variations. IBM Corporation mainframe host computer models of the 1990's, using the ESCON architecture and running IBM's MVS operating system do not have the same problem, since both the host computer architecture and the operating system allow IBM mainframe host computers to share disks and manage channels in a way that open system operating systems do not. In IBM's non-open system, the architecture of the system chooses the available channels to provide hosts with balanced access when I/O requests are made. Hence it is not a configuration problem.

Most open system operating systems, such as Unix and its derivatives and variations, do not allow multiple hosts to share access to all disks and all channels in this way. Instead, logical access "routes" as it were, must be configured for each host computer before I/O requests are made. For an HSM system such as that shown in FIG. 3, if five open system host computers ATT-1, SEQU-8, Sequent-6, SequentA HP-HO, ATT-E, and SGI are sharing the system, then a human operator would manually analyze the logical volumes requested by each and attempt to assign them to the Ports (A, B, C, D) on each system adapter SA for each host in such a way as to provide an allocation that is balanced for performance purposes.

For example, if Host ATT-1 has SCSI channels C and D of disk adapter 1 (DA-1) assigned to it, and physical disks 00, 10, 20, 30, each of which is assigned to SCSI channel C, this is probably the least optimal distribution for performance. If I/O requests come in for all 4 volumes at the same time, the requests will have to be queued one behind the other, since SCSI channel C1 can only process one at a time. A better distribution for performance purposes would be to allocate physical volumes to each SCSI channel. In that case, if I/O requests came in at the same time for all 4 volumes, two would start processing immediately, (one per SCSI channel) while 2 would probably be queued. If a human operator only has to solve a distribution problem like this, it may only take him or her a few minutes. However, most users of HSM systems in an open systems environment have far more complex situations.

Typically, a number of host computers share the HSM system. Each of these, such as host computer ATT-1 on system adapter SA-3, might have 128 logical volumes (or more) allocated to it on the HSM system of FIG. 3. Of these, 16 logical volumes might be configured as RAID level 1 or mirrored volumes (in which case they will already have at least been allocated to different physical drives by the program that configures the back-end), 64 logical volumes might be configured as RAID level 5, 32 logical volumes might be configured as RAID level 4, and another 16 logical volumes might simply be reserved as spares for later configuration. Host B might have a similarly complex set of requirements.

The different RAID types required by a user impose another level of complexity on the problem, namely that, ideally, RAID groups should not be allocated to the same host.

Thus, in distributing logical volumes to a front end, the constraints imposed by disk format type, channels and host configurations must all be considered as the distribution is done. In distributing volumes to the front-end, the back-end configuration should not be changed. The way in which host systems are attached is also a given, as is the number of volumes of each type requested by each host. Any distribution of logical volumes has to be done with these and similar constraints in view. In addition, attempts to optimize for one host at a time, often lead to poor overall results. A distribution that would provide good performance for a first host, may not leave as many desirable options for the next host. As the number of hosts sharing the HSM system increases, the last host may be left with a configuration that is worse than random chance resulting from the original back-end distribution.

Consequently, a human operator attempting to distribute a complex set of logical volumes for all the hosts shown in FIG. 3 might spend a minimum of five or more hours or frequently even days attempting to create a distribution of the logical volumes across the host computers' SCSI channels that is reasonably performance balanced for the various open system hosts.

It is an object of this invention to automate the distribution of logical volumes to an HSM system front-end.

It is another object of the present invention to distribute logical volumes to an HSM system front-end in a way that is likely to provide reasonable performance for each of the computers sharing an HSM system.

SUMMARY OF THE INVENTION

These and other objects are achieved by a system for distributing logical volumes to an HSM system front end shared by several host computers by ordering an array of logical volumes so that each volume that is likely to conflict with another volume is significantly separated from that other volume. Ordering is done iteratively, beginning with the disk type, and then iterating through the logical volume level, next through a target level (the physical disk), then SCSI level, then the disk adapter level, and the system level until all the disks in all the disk adapters in the HSM system have been ordered. As each iteration occurs, units in a source array from the level being operated on are ordered so that those close to each other are moved apart, within the space available, in the destination array according to a procedure that establishes a gap between them that is based on an approximate ratio of the number of units in the source array to the number of spaces available in the destination array. Once the volumes are ordered, RAID volumes within them are scored for appropriate ordering, and if desirable and possible, swaps occur so that RAID groups will have better distribution. Finally, all the volumes are then assigned, one by one, to host computers, based on input requests made by each host.

BRIEF DESCRIPTION OF THE DRAWINGS

FIG. 2a is a schematic diagram of an ordering of two physical disks with an equal number of logical volumes according to the present invention.

FIG. 2b is a schematic diagram of an ordering of two physical disks, one having an odd number of logical volumes, the other having an even number of logical volumes according to the present invention.

FIG. 4 is a schematic diagram of the host's names of the configuration shown in FIG. 3 above.

FIG. 5 is a schematic diagram of a set of inputs to the present invention.

FIG. 6 is a schematic diagram of an input screen of the present invention by which a user can request a specific number of volumes by port.

FIGS. 7a and 7b schematic diagram showing the results for one host.

FIG. 8 is a schematic diagram showing the results for a second host.

FIG. 9 is a schematic diagram showing the results for a third host.

FIG. 10 is a schematic diagram showing the results for a fourth host.

FIG. 11 is a schematic diagram showing the results for a fifth host.

FIG. 12 is a schematic diagram showing the results for a sixth host.

FIG. 13 is a schematic diagram showing the results for a seventh host.

FIG. 14 is pseudo-code illustrating a procedure of the present invention.

DETAILED DESCRIPTION OF THE INVENTION

Figure 1:
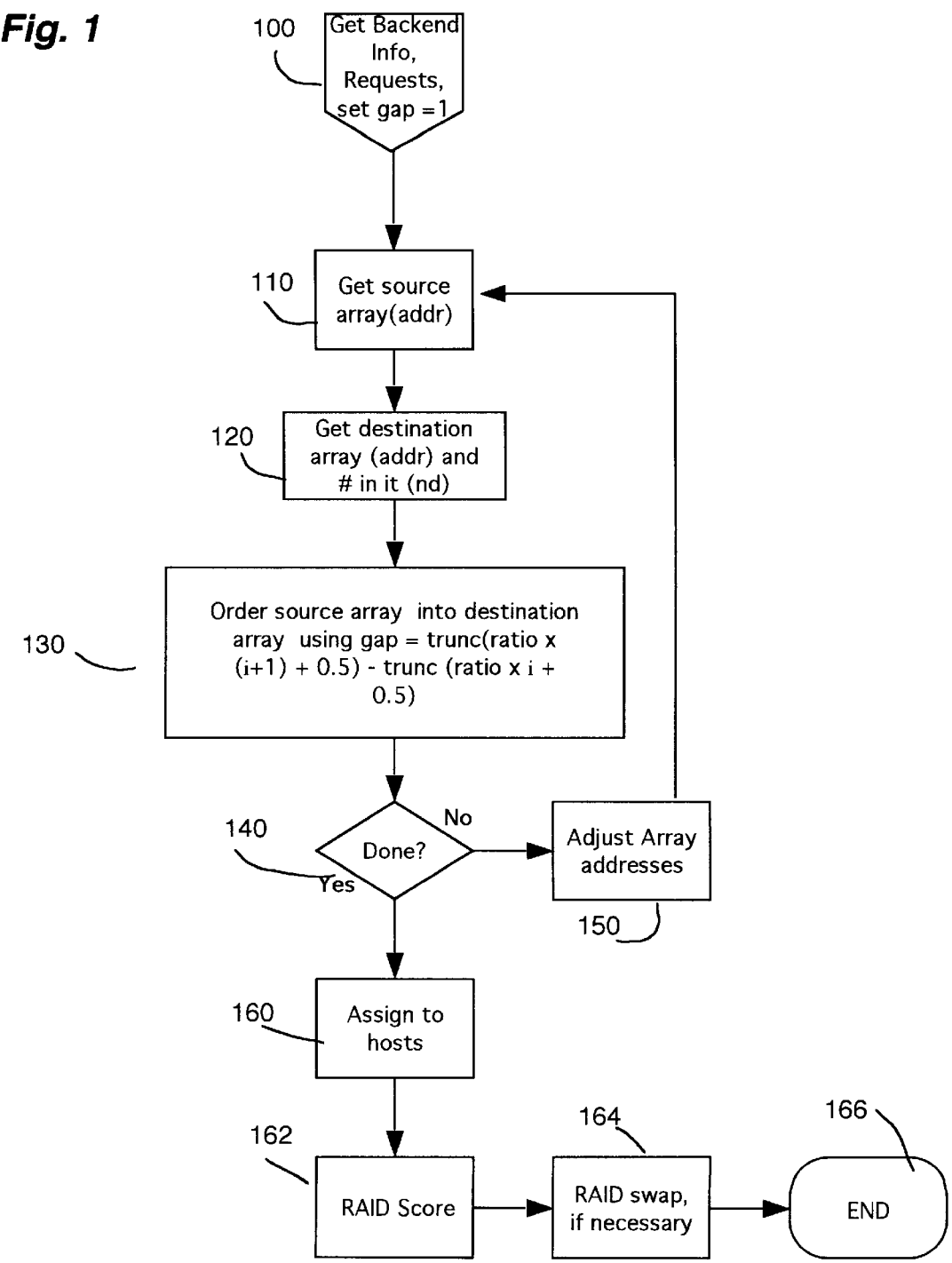
FIG. 1 is a flow diagram of the logic of the present invention.

In FIG. 1 a flow diagram of the present invention is shown. In a preferred embodiment, at step 100 the present invention gets the information generated by the backend configuration program (inventors' Assignee, EMC Corporation's program that configures disks for the backend of an HSM system), together with any specific volume allocation requests made by a user through an input screen of the present invention (as will be described below.) This input describes a complete mapping of a backend 05, such as that shown in FIG. 3.

Returning to FIG. 1, at step 110, a preferred embodiment of the present invention gets the address of the next source array, and then at step 120, the address of a destination array. One or more source arrays are created at each level. For example, turning to FIG. 3 briefly, if there are six physical disks (00M1 through 4DM2) connected to SCSI C on disk adapter DA-1, and each of those has four logical volumes V, then 6 source arrays having 4 elements each will be created by the present invention, along with one destination array for that SCSI having 24 elements. Each source array is then merged into the destination array by ordering the elements of the source array so that they are placed into the destination array with a gap between them. The gap is calculated as follows:

$$gap = trunc(ratio \times (i+1) + 0.5) - trunc(ratio \times i + 0.5)$$

where trunc means round down the result, and ratio is the number of empty elements left in the destination array (in this example, the value of left would initially be 24), divided by the number of slots (ns) or elements in the source array (in this example, 4) and i is an index variable using the number of slots (ns) in the source array. Thus, for this example, the initial ratio would be left/ns=24/4=6. A pseudo-code implementation of the procedure is shown in FIG. 14.

Turning now to FIG. 2a, a simple application of the procedure is shown. In FIG. 2a, physical disk 15a is shown having four logical volumes V—V1, V2, V3, and V4. In array form, this would create source array SRC1. If physical disks 15a and 15b are the only two physical disks at this level, and assuming physical disk 15b also has 4 volumes V—V5, V6, V7 and V8, then the logical volume destination array Dest1b(1b) for this level might initially look like array Dest1b(1a), after SRC1 has been ordered into it.

In a preferred embodiment, the procedure statement that initiates this looks like:

Procedure TTypeOrder.merge(dist: PDevsList; nd, left: integer; source: PDevsList; ns; integer where TtypeOrder.merge is the ordering function, dist is the destination array, Pdevslist is a type indicator (not a parameter), nd is the number of slots or elements in the destination array, left is the number of free spaces or elements in the destination array, source is the array being merged or ordered into the destination array, and ns is the number of slots or elements in the source array.

In a preferred embodiment, the ratio is calculated as:

left/ns>=1 that is, the ratio is equal to the number of empty spaces or elements left divided by the number of slots in the source. In a preferred embodiment, the gap is initially set to 1, for the ordering of a new set of input arrays and then calculated as the ordering occurs.

Figure 3:
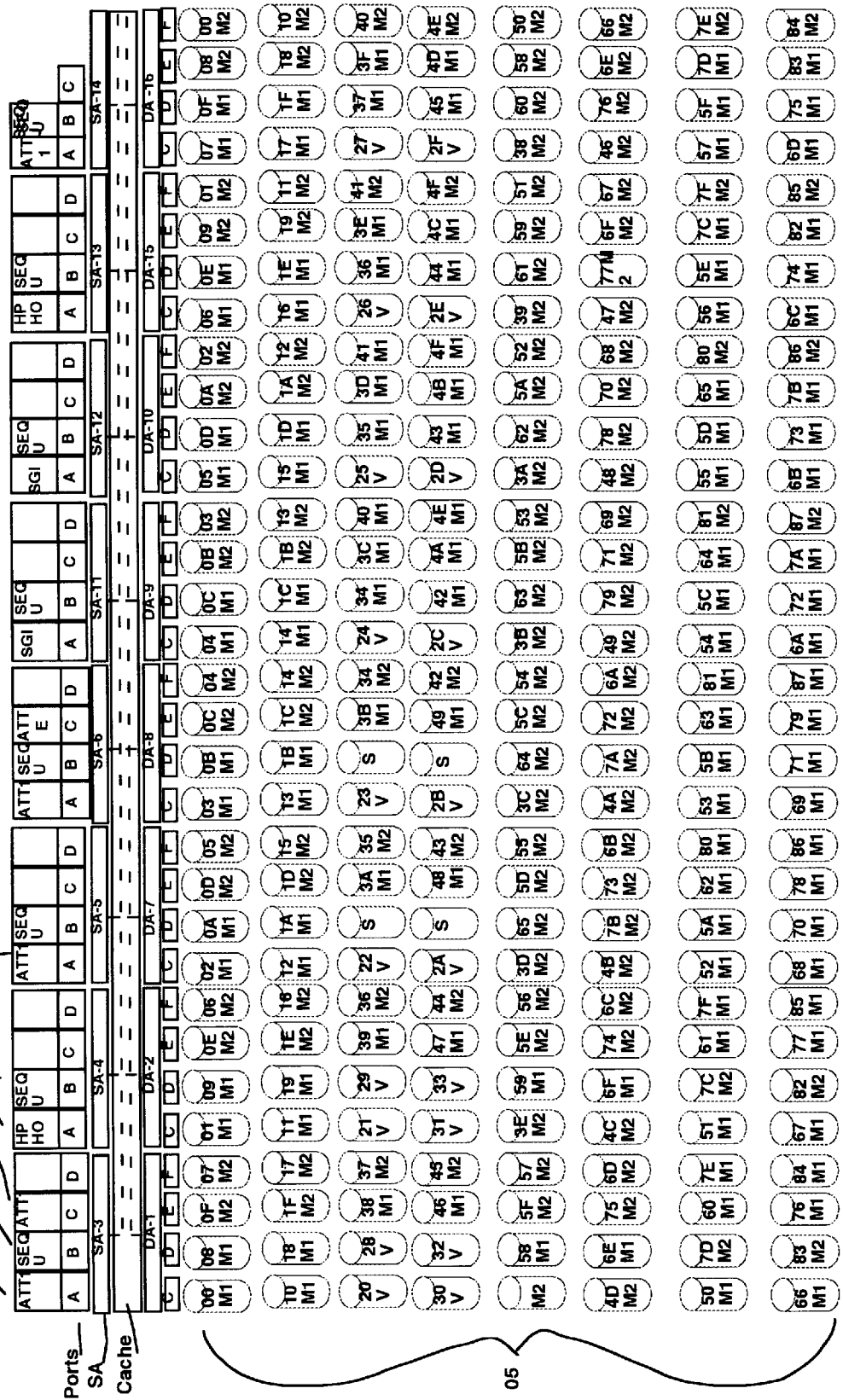
FIG. 3 (Prior Art) is a schematic diagram of a portion of a full HSM system, showing various parts before the ordering of the present invention.
Figure 15:
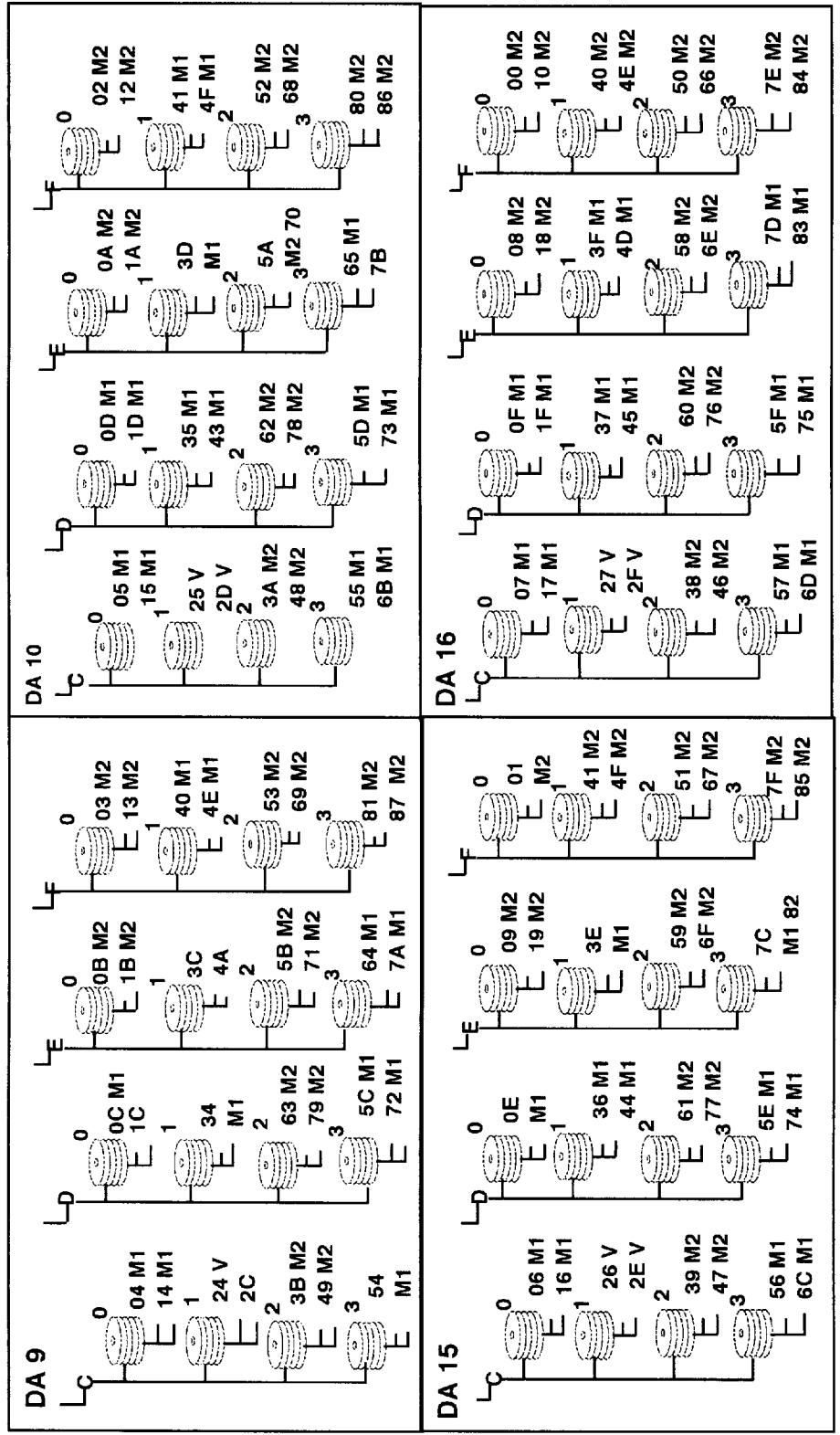
FIG. 15 is a schematic diagram of the disks in four disk adapters of an HSM system.

Returning briefly to FIG. 3, In a preferred embodiment, the present invention proceeds by first ordering all the units within a level. Using the example of FIG. 3, if the physical disk 00M1 has four logical volumes on it, with the first two being RAID 5-type volumes (R5) and the second two being normal-type volumes (NV), the present invention would order the RAID 5 volumes into a logical volume array, then the NV volumes, so that a typical end result would look like R51,NV1,R5-2, and NV2. In this manner, the present invention would order all the units in the HSM by type. Thus, assuming that ordering by type has already occurred, the next level of ordering would be by logical volume (sometimes known as hypervolume, since one physical disk may have several logical volumes assigned to it.) In the example of FIG. 3, all the logical volumes in physical disk 00M1 attached to SCSI C in DA-1 would be ordered, then all the logical volumes in physical disk 10M1 attached to SCSI C in DA-1, and so on through physical disk 66M1 attached to SCSI C in DA-1. The results are stored in a set of destination arrays for SCSI C that will become source arrays for the next round of ordering—the physical disk level. If it is assumed that each physical disk contains 4 logical volumes, the logical volume ordering step would have created 8 physical volume destination arrays having 4 elements each for SCSI connector C in DA-1 of FIG. 3.

Returning to FIG. 3, the next level of ordering is the physical disk level. The 8 sets of physical volume arrays for the physical disks attached to SCSI connector C in DA-1 created by the last step will be ordered into a single SCSI destination array for SCSI connector C for DA-1, that has 32 elements. Thus, still in FIG. 3, in this example, now the 8 destination arrays for the physical volumes on SCSI connector C of DA-1 are ordered into one SCSI destination array for SCSI connector C of DA-1, that has 32 elements.

In a preferred embodiment, all the physical disks in the HSM are ordered in this way, until all the units have been ordered for this level. Next, ordering of the disks through the SCSI connector level is done. As a result of the last step, if we look at FIG. 3, DA-1, there would have been four destination arrays of SCSI destination arrays created, one for each SCSI connector C through F of DA-1. Each of these four has 32 (8 physical * 4 logical) elements. To order all the disks attached to all the SCSI connectors of DA-1, a DA level destination array of 108 elements is created for DA-1. The four SCSI destination arrays now become the source arrays to the DA level ordering, resulting in one DA connector array for DA-1 having 128 elements. Processing proceeds at the SCSI ordering level for the remaining disk adapters DA-1 through DA-(n).

Next, ordering is done at the system level. Since, by this point, an array of ordered volumes has been created for each Disk Adapter DA-1 through DA-(n), the set of these arrays are the source input for the system ordering level. If each Disk adapter had 96 units, and there are 8 disk adapters n (n=8 in the HSM system of FIG. 3, then this step orders all the units of all the disk adapters into an array of 768 elements. As will be apparent to those skilled in the art, the number of units will vary from system to system, as capacities and organizations change.

The final array of ordered elements is then used to satisfy configuration requests made by the user for the individual host systems.

Turning now to FIG. 4, an input screen showing 8 System Adapters (SA-3, SA-4, SA-5, SA6, SA11, SA12, SA-13 and SA-14) each having 4 ports A–D, is shown, connecting to 7 host computers (ATT-1, HP-Host, SGI, Sequent-6, Sequent-8, Sequent-A, and ATT-Everest (not shown) where the host names represent the type of open system in use.)

With reference now to FIG. 5, a screen depicting a basic configuration request for the 7 host computers is illustrated. In this example, host ATT-1 requests 40 units of type 2M and 2 units of type V, while host Sequent-8 requests 20 units of type 2M having 8862 cylinders, 3 units of type 2M having 8738 cylinders and 2 units of type V.

Turning now to FIG. 6, a preferred embodiment of the present invention also allows a user to pre-allocate a number of volumes to one or more specific ports A–D of a system adapter A to a specific host. This may be desirable for real-time applications, for example, in which a user wishes to guarantee that certain volumes are optimized across ports. In this instance, the present invention honors those requests and orders the rest of the volumes by the methods described above. FIGS. 6–14 show the results of the ordering done by the present invention for the hosts and disks shown in FIG. 3. As will be apparent to those skilled in the art, if the user pre-configures too many of the units in this way, it becomes increasingly difficult to obtain good overall performance for the remaining units in the HSM system. However, it is unlikely that the majority of users will want to constrain the system in this way.

Nevertheless, in a preferred embodiment of the present invention, if the system determines that any distributions have resulted in potentially unacceptable performance conflicts, these would be highlighted in the results screen displays of FIGS. 7–13.

Turning briefly to FIGS. 7*a* and 7*b*, a results display for the ATT 1 host, the results of the distribution of volumes according to the method and apparatus of the present invention are shown. In the first column, it can be seen that system adapter 3's Port A, has channel addresses 00–09 attached to it and to these, in turn, the present invention has assigned volumes 10–19 respectively. As can be seen, volumes 10–19 are spaced apart across all the DA's shown, in a good distribution. Volume 10 for example, is located at DA-1, SCSI C, tag 0, while Volume 11 has been distributed to DA-2, SCSI C, tag 0 and so on.

Now turning to FIG. 2*a* again, it can be seen that when the number of elements in the source and destination arrays are even numbers, it is fairly simple to calculate a simple ratio to use as the gap for distribution purposes. Here, for example, a simple ratio gap calculation results in a value of 2 for array SRC1. And similarly, in the next step shown in FIG. 2*a,* the number left in Dest(1*a*) is 4 after SRC1 has been ordered into it. The ratio for ordering SRC2 would then be 4/4 or 1, so that no empty spaces are skipped in the destination dest(1*b*) at this point.

However, in FIG. 2*b,* it can be seen that a simple ratio will not produce a whole number, but a whole number and a decimal point. For example, in ordering the first array into dest(1*a*), the original number of empty spaces in dest(1*a*) is 9, which, when divided by the number of elements in source array SRC1, 5, results in a simple ratio of 9/5 yielding a fraction or decimal. Legend L1, in FIG. 2b, illustrates how the present invention calculates a gap for ordering SRC1 into Dest(1a). Using the calculation described below and shown in FIG. 14 in pseudo-code, the present invention calculates that for each i, the gap is set as shown in the function below-when i=1, for example, it is as shown in FIG. L1 of 2b. In a preferred embodiment, a gap is defined as the number of empty cells between two elements, including the selected one. The selected one is indicated by i, which is used as an index through the destination array, Dest (1a) of FIG. 2b. As can be seen in L1, when calculating the gap after selecting the 0th position of Dest(1a), it will be 2, next 2, then 1 (thus placing volumes 3 and 4 next to each other as shown), then 2 and so on.

In a preferred embodiment, trial and error showed, surprisingly, that the best results were produced when the function given below for calculating the gap was used, namely:

$$gap=trunc(ratio \times (i+1)+0.5)-trunc(ratio \times i+0.5).$$

Figure 2C:
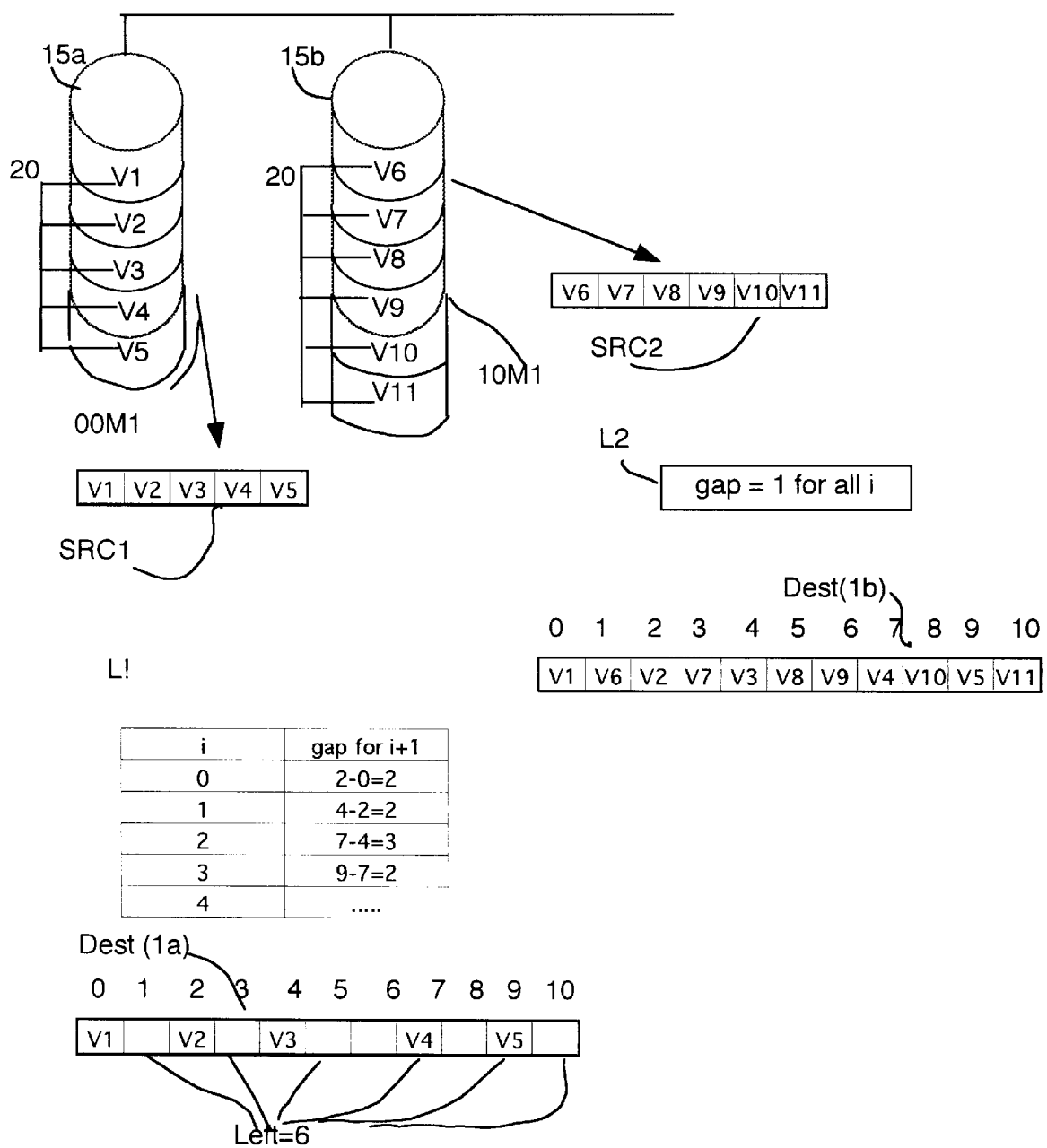
FIG. 2c is a schematic diagram of an ordering of two physical disks, each having an odd number of logical volumes, according to the present invention.

It appeared through experimentation that this tended to produce a periodic pattern such as the gap sizes of 2,2,1 and 2 of L1 of FIG. 2b for example, that produced better results than a simple ratio. Similarly, in FIG. 2c, it can be seen that the gap size results are 2,2,3, and 2.

Returning briefly to FIG. 1, at step 162, in a preferred embodiment, after all volumes have been ordered as described above and allocated to the hosts, the present invention goes through the distribution to analyze or score the RAID groups that resulted from the ordering. In scoring, the best score occurs for a RAID group that is not yet assigned to that host, a "good" score is given to the oldest RAID group already assigned to that host, and the worst score is given when the same RAID group is assigned in a sequence. Where RAID volumes from the same RAID group have been assigned to the same host, the present invention checks, at step 164, to see if better allocations can be made by swapping the conflicting volumes. In a preferred embodiment, it will try to get another RAID volume from the same physical disk, but which is from another RAID Group.

Still in FIG. 1, once any RAID swaps have been performed at step 164, the system ends, at step 166, with the results displayed as shown in FIGS. 7–13.

In a preferred embodiment, once volumes have been distributed to hosts by the present invention, updates to that allocation can also be handled in the same way.

In a preferred embodiment, the present invention is embodied in computer application software written in the Pascal programming language for Unix operating systems. As will be apparent to those skilled in the art, it could also be embodied in computer application software written in other programming languages, such as C, or C++, or assembler or ADA, or Visual Basic and so on, for either Unix or other UNIX-like operating systems. Similarly, while a preferred embodiment operates as application software brought into a computer from a disk library for execution, it could also be embodied in firmware or circuitry or gate arrays for special purpose applications.

Those skilled in the art will appreciate that the embodiments described above are illustrative only, and that other systems in the spirit of the teachings herein fall within the scope of the invention.

What is claimed is:

1. A computer-implemented method for distributing volume units to host computers sharing a multi-volume disk system having a plurality of levels of organization comprising the steps of:

placing a first level into at least one source array having a plurality of elements;

ordering a first source array into a destination array for a next level, the destination array having a number of elements equal to or greater than the sum of the number of elements in all source arrays being ordered into the destination array;

calculating a gap for spacing empty elements apart between the elements of the destination array according to the following procedures:

$$gap=trunc(ratio \times (i+1)+0.5)-trunc(ratio \times i+0.5).$$

where trunc instructs the computer system to round the result down, i is an index to the selected element in the destination array, and ratio is calculated by dividing the number of empty elements left in the destination array by the total number of elements in the destination array.

spacing the elements in the destination array said gap for spacing empty elements apart, whereby the destination array becomes the source array for the next level until all levels have been ordered.

2. The method of claim 1, wherein the step of spacing the elements in the destination array further includes the step of updating.

3. A computer-implemented system for distributing volume units to host computers sharing a multi-volume disk system having a plurality of levels of organization:

a processor having memory coupled to it for storing arrays;

a distribution program executing in the processor for ordering arrays whereby the distribution program places a first level into at least one source array having a plurality of elements, orders a first source array into a destination array for a next level, the destination array having a number of elements equal to or greater than the sum of the number of elements in all source arrays being ordered into the destination array; said distribution program calculating the number of empty spaces according to the following procedure:

$$gap=trunc(ratio \times (i+1)+0.5)-trunc(ratio \times i+0.5),$$

where trunc instructs the computer system to round the result down, i is an index to the selected element in the destination array, and ratio is calculated by dividing the number of empty elements left in the destination array by the total number of elements in the destination array; said distribution program spacing the elements in the destination array said gap spacing the number of empty elements apart, whereby the destination array becomes the source array for the next level until all levels have been ordered.

4. The system of claim 3, wherein said distribution program spacing the elements in the destination array includes updating.

* * * * *